US008700201B2

(12) United States Patent
Yoshino et al.

(10) Patent No.: US 8,700,201 B2
(45) Date of Patent: Apr. 15, 2014

(54) VIBRATION SUPPRESSING DEVICE

(75) Inventors: Kiyoshi Yoshino, Niwa-Gun (JP);
Hiroshi Inagaki, Niwa-Gun (JP);
Tomoharu Ando, Niwa-Gun (JP);
Hiroshi Ueno, Niwa-Gun (JP); Akihide Hamaguchi, Niwa-Gun (JP); Hajimu Ishii, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 392 days.

(21) Appl. No.: 13/226,143

(22) Filed: Sep. 6, 2011

(65) Prior Publication Data

US 2012/0065766 A1    Mar. 15, 2012

(30) Foreign Application Priority Data

Sep. 13, 2010  (JP) ................................. 2010-204683
Oct. 22, 2010  (JP) ................................. 2010-237703

(51) Int. Cl.
*G06F 19/00*  (2011.01)
*G01F 17/00*  (2006.01)
*G01L 7/00*  (2006.01)
*G01F 23/00*  (2006.01)
*G01N 11/00*  (2006.01)

(52) U.S. Cl.
USPC ............. 700/174; 700/175; 700/177; 702/56

(58) Field of Classification Search
USPC ............................ 700/174, 175, 177; 702/56
See application file for complete search history.

(56) References Cited

U.S. PATENT DOCUMENTS

| 4,643,592 | A  | * | 2/1987  | Lewis et al. ................... 384/100 |
| 4,823,599 | A  | * | 4/1989  | Schneider ........................ 73/579 |
| 6,993,410 | B2 | * | 1/2006  | Esterling ....................... 700/177 |
| 8,317,440 | B2 | * | 11/2012 | Roders .......................... 409/131 |
| 2005/0021265 | A1 | * | 1/2005 | Esterling ........................ 702/76 |
| 2009/0013790 | A1 | * | 1/2009 | Roders ............................ 73/660 |
| 2011/0203407 | A1 |   | 8/2011 | Miyaji |
| 2011/0238335 | A1 | * | 9/2011 | Sharp et al. ..................... 702/56 |

FOREIGN PATENT DOCUMENTS

| JP | 2000-210840 A1 | 8/2000 |
| JP | 2002-283186    | 10/2002 |
| JP | 2007-044852 A1 | 2/2007 |
| JP | 2008-290118 A1 | 12/2008 |
| JP | 2009-101495    | 5/2009 |

OTHER PUBLICATIONS

Japanese Office Action, Japanese Application No. 2010-204683, dated Jan. 29, 2014 (2 pages).

* cited by examiner

*Primary Examiner* — Ronald Hartman, Jr.
(74) *Attorney, Agent, or Firm* — Burr & Brown, PLLC

(57) ABSTRACT

A vibration suppressing device includes a memory unit storing a stable rotation speed calculated by an arithmetical unit in association with a rotation speed range that includes the stable rotation speed, in which, when a command rotation speed that is a rotation speed of a rotary shaft is inputted in starting machining operation by rotation of the rotary shaft and, the arithmetical unit determines whether the command rotation speed is included in the rotation speed range or not, reads out the stable rotation speed when the command rotation speed is included in the rotation speed range and outputs the stable rotation speed to an NC device instead of the command rotation speed, and starts the machining operation at the stable rotation speed.

7 Claims, 14 Drawing Sheets

FIG. 5

| SCOPE | HISTORY | SCOPE | | STABLE ROTATION SPEED WITHIN SCOPE [min⁻¹] | MAXIMUM VIBRATIONAL ACCELERATION [G] | OUT OF SCOPE | |
|---|---|---|---|---|---|---|---|
| | | UPPER LIMIT [min⁻¹] | LOWER LIMIT [min⁻¹] | | | LOWER STABLE ROTATION SPEED [min⁻¹] | UPPER STABLE ROTATION SPEED [min⁻¹] |
| 1 | 1 | 6000 | 9000 | 7640 | 3 | 4620 | 11220 |
| | 2 | | | 7870 | 3.2 | 4770 | 11600 |
| | 3 | | | 7930 | 3.5 | 4820 | 11690 |
| | ... | | | ... | ... | ... | ... |
| 2 | 1 | 15000 | 21000 | 18800 | 3.3 | 14800 | 23250 |
| | 2 | | | 19100 | 3.6 | 15030 | 23680 |
| | ... | | | ... | ... | ... | ... |

VIBRATION SUPPRESSING DEVICE

BACKGROUND OF THE INVENTION

This application claims the benefit of Japanese Patent Application Numbers 2010-204683 filed on Sep. 13, 2010 and 2010-237703 filed on Oct. 22, 2010, the entirety of which is incorporated by reference.

TECHNICAL FIELD

The present invention relates to a vibration suppressing device, provided in a machine tool configured to perform machining operation while rotating a tool or a workpiece, for suppressing chatter vibration generated during the machining operation.

BACKGROUND ART

Conventionally, in a machine tool rotating a tool to grind the surface of a workpiece for example, chatter vibration may possibly be generated during the machining operation due to low rigidity of the tool and the like. In order to eliminate the above, a vibration suppressing device has been introduced. In the vibration suppressing device, when generation of the chatter vibration is detected during machining operation, chatter frequency of the chatter vibration is calculated, a stable rotation speed capable of suppressing the chatter vibration is calculated using the chatter frequency, and the rotation speed of the tool is changed to the stable rotation speed (for example, the vibration suppressing devices as described in Japanese Patent Application Laid-Open Publication No. 2007-44852 and No. 2008-290118).

On the other hand, as described in Japanese Patent Application Laid-Open Publication No. 2000-210840, a technology has also been devised in which whether the chatter vibration of a workpiece is regeneration type chatter vibration or compulsory chatter vibration is determined, and vibration suppressing measures suitable to each of them are automatically taken.

However, the vibration suppressing devices described in Japanese Patent Application Laid-Open Publication No. 2007-44852 and No. 2008-290118 change the rotation speed to a stable rotation speed after detecting the chatter vibration. Therefore, when rotation of the tool is once stopped and then the tool is rotated again and machining operation is started, the following control is performed: the tool is rotated again at a command rotation speed at the time of start of the machining operation; the chatter vibration is detected; and thereby the rotation speed is changed to a stable rotation speed. Accordingly, every time the machining operation is started, a chattering mark is generated on the surface and the like of the workpiece because of the chatter vibration. Further, machining efficiency deteriorates, and machined surface accuracy becomes inferior, and the like.

On the other hand, according to the method of Japanese Patent Application Laid-Open Publication No. 2000-210840, the process is performed based on a reference frequency stored beforehand, and therefore the effect can be exerted as far as the natural frequency does not change. However, when the machining operation is started again after the machining operation is once finished, a holder holding a tool may be exchanged, the tightening force in holding the tool to the holder may change, or rigidity may change due to heat generation of a rotary shaft and the like. As a result, the natural frequency may change, and therefore the reference frequency stored beforehand cannot be utilized.

SUMMARY OF THE INVENTION

Thus, the present invention has been developed considering such circumstances, and its object is to provide a vibration suppressing device in which chatter vibration is never generated during machine operation.

In order to achieve the object, a first aspect of the present invention is a vibration suppressing device for suppressing chatter vibration generated in a rotary shaft in a machine tool comprising the rotary shaft for rotating a tool or a workpiece. The vibration suppressing device includes a detecting unit configured to detect generation of the chatter vibration, an arithmetical unit configured to calculate a stable rotation speed capable of suppressing the chatter vibration based on a detected value detected by the detecting unit, a rotation speed control unit configured to control a rotation speed of the rotary shaft, and a memory unit configured to store the stable rotation speed calculated by the arithmetical unit in association with a rotation speed range in which the stable rotation speed is included, wherein when a command rotation speed that is a rotation speed of the rotary shaft is inputted at time of starting machining operation by rotation of the rotary shaft, the arithmetical unit determines whether or not the command rotation speed is included in the rotation speed range, reads out the stable rotation speed when the command rotation speed is included in the rotation speed range, outputs the stable rotation speed to the rotation speed control unit instead of the command rotation speed, and starts machining operation at the stable rotation speed.

A second aspect of the present invention is the first aspect of the present invention, wherein when generation of chatter vibration is detected by the detecting unit during machining operation at the read out stable rotation speed, the arithmetical unit calculates a new stable rotation speed based on a detected value related with the chatter vibration detected this time, commands the rotation speed control unit to change the rotation speed of the rotary shaft to the new stable rotation speed, stores the new stable rotation speed in the memory unit in association with the rotation speed range. Further, when a command rotation speed included in the rotation speed range is inputted next time, the arithmetical unit outputs the new stable rotation speed to the rotation speed control unit.

A third aspect of the present invention is one of the first aspect and second aspects of the present invention, wherein the detecting unit detects time-domain vibration accompanying rotation of the rotary shaft, obtains frequency of the rotary shaft and frequency-domain vibrational acceleration in the frequency based on the time-domain vibration, compares frequency-domain vibrational acceleration and a predetermined threshold value. Further, when the frequency-domain vibrational acceleration exceeds the predetermined threshold value, the detecting unit determines that chatter vibration has been generated. The arithmetical unit stores, in the memory unit, the frequency-domain vibrational acceleration of the time when the chatter vibration is determined to have been generated.

A fourth aspect of the present invention is the third aspect of the present invention, wherein the arithmetical unit calculates a plurality of stable rotation speeds capable of suppressing the chatter vibration based on a detected value by the detecting unit, and stores a stable rotation speed not included in the rotation speed range also in the memory unit along with a stable rotation speed included in the rotation speed range out of the plurality of the stable rotation speeds.

In order to achieve the object, a fifth aspect of the present invention is a vibration suppressing device for suppressing chatter vibration generated in a rotary shaft in a machine tool comprising the rotary shaft for rotating a tool or a workpiece. The vibration suppressing device includes a detecting unit configured to detect generation of the chatter vibration, a rotation speed changing unit configured to change a rotation speed of the rotary shaft, a history control unit configured to store, when the detecting unit for vibration does not detect generation of the chatter vibration at the rotation speed after change by the rotation speed changing unit, the rotation speeds of before and after the change in a memory device as a pair; and a rotation speed substituting unit configured, when the rotary shaft is rotated and machining operation is started and if the rotation speed commanded is equal to the rotation speed before the change stored in the memory device by the history control unit, to rotate the rotary shaft at the rotation speed after the change that forms a pair with the rotation speed before the change instead of the rotation speed commanded.

A sixth aspect of the present invention is the fifth aspect of the present invention, wherein the rotation speed changing unit is configured to change the rotation speed of the rotary shaft at 10% or below override.

According to the aspects of the present invention, the machining operation is started at a rotation speed with lower possibility of generating the "chatter vibration" than in the case rotated at the command rotation speed. Therefore, it becomes likely to perform machining operation never generating the "chatter vibration". Accordingly, it is possible to finish a highly accurate machined surface without any chattering mark remained, and machining efficiency and machined surface accuracy can be improved.

According to the second aspect of the present invention, generation of the "chatter vibration" is detected even during machining operation at a stable rotation speed. When the "chatter vibration" has been detected, a new stable rotation speed is calculated, and the machining operation is continued at the new stable rotation speed. The new stable rotation speed is adopted instead of the command rotation speed in machining operation of next time. Therefore, the "chatter vibration" can be suppressed more effectively.

According to the third and fourth aspects of the present invention, the maximum value of the frequency-domain vibrational acceleration detected as the "chatter vibration" and the stable rotation speed in a range other than the rotation speed range are also stored in the memory unit. Therefore, by referring to the history of them, the history of change of the machining condition can be secured easily. Accordingly, change of the condition can be managed, and estimation of the wear of the tool and prediction of the life of the tool are also possible.

Further, according to the sixth aspect of the present invention, minute adjustment of the rotation speed can be performed easily.

BRIEF DESCRIPTION OF THE DRAWINGS

FIG. 5 is an explanatory drawing showing stable rotation speeds, maximum value of frequency-domain vibrational acceleration and the like stored in the memory unit of the embodiment 1 in a table form.

DETAILED DESCRIPTION OF THE PREFERRED EMBODIMENTS

A vibration suppressing device as one embodiment of the present invention will be described below in detail referring to drawings.

Embodiment 1

Figure 1:
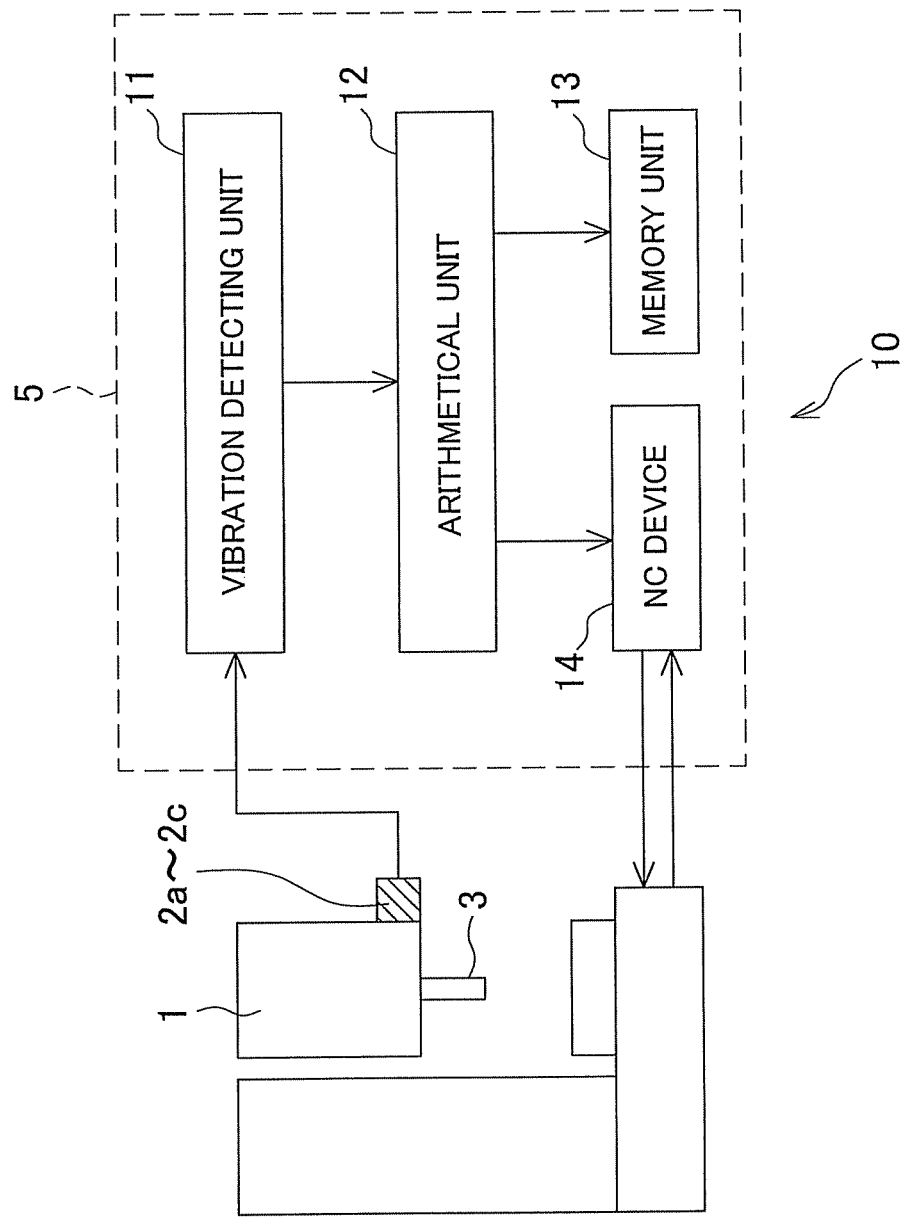
FIG. 1 is an explanatory drawing showing a block constitution of a vibration suppressing device of an embodiment 1.
Figure 2:
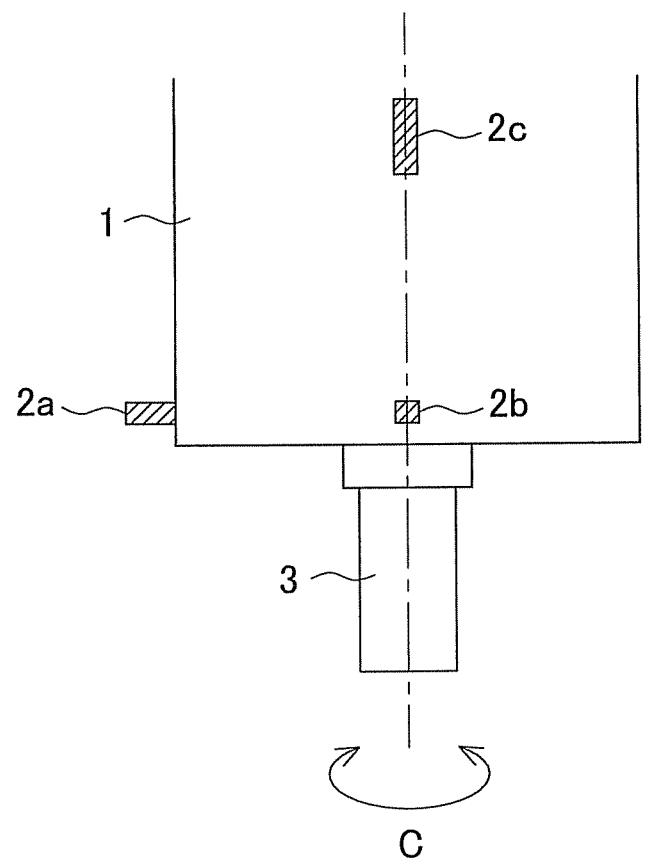
FIG. 2 is an explanatory drawing showing a side view of a rotary shaft housing that is an object of suppressing vibration of the embodiment 1.

FIG. 1 is an explanatory drawing showing a block constitution of a vibration suppressing device 10. FIG. 2 is an explanatory drawing showing a side view of a rotary shaft housing 1 that is an object of suppressing vibration, and FIG. 3 is an explanatory drawing showing an axial view of the rotary shaft housing 1.

The vibration suppressing device 10 is a device for suppressing "chatter vibration" generated in a rotary shaft 3 provided rotatably around C-axis in the rotary shaft housing 1, and includes vibration sensors 2a-2c for detecting time-domain vibrational acceleration (that means vibrational acceleration on a time axis) that is a characteristic value accompanying vibration generated in the rotary shaft 3 during rotation, and a control device 5 analyzing values detected by the vibration sensors 2a-2c to determine whether the "chatter vibration" has been generated or not and controlling the rotation speed of the rotary shaft 3 based on the result of the determination.

Figure 3:
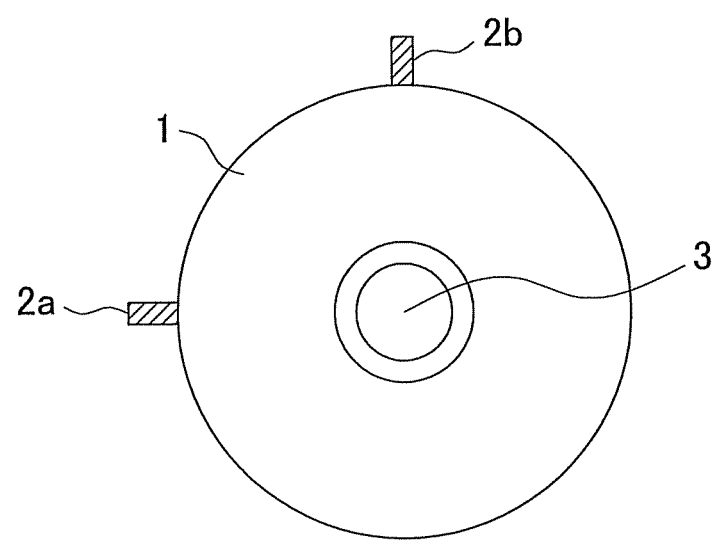
FIG. 3 is an explanatory drawing showing an axial view of the rotary shaft housing of the embodiment 1.

As shown in FIG. 2 and FIG. 3, the vibration sensors 2a-2c are attached to the rotary shaft housing 1, and one vibration sensor is arranged to detect the time-domain vibrational acceleration in an orthogonal direction with respect to other vibration sensors (for example, the vibration sensors 2a-2c are attached so as to respectively detect the time-domain vibrational acceleration in X-axis, Y-axis, Z-axis directions orthogonal with each other).

On the other hand, the control device 5 includes a vibration detecting unit 11 for the chatter vibration which obtains frequency-domain vibrational acceleration (vibrational acceleration on a frequency axis) by performing analysis based on time-domain vibrational acceleration detected by the vibration sensors 2a-2c, and detects generation of the "chatter vibration" with the fact that its maximum value exceeds a predetermined threshold value. Further, the control device 5 includes an arithmetical unit 12 calculating a stable rotation speed by a calculation formula described below using a chatter frequency at which the frequency-domain vibrational acceleration becomes a maximum value when the chatter vibration has been detected, a memory unit 13 storing the stable rotation speed calculated, and an NC device 14 controlling the machining operation in the rotary shaft housing 1 by changing the rotation speed of the rotary shaft 3 and the like. Machining operation information such as the number of tool flutes used for calculating the stable rotation speed and the command rotation speed in starting the machining operation as well as a variety of data such as the threshold value for detecting the "chatter vibration" and the like can be inputted by a worker.

Figure 4:
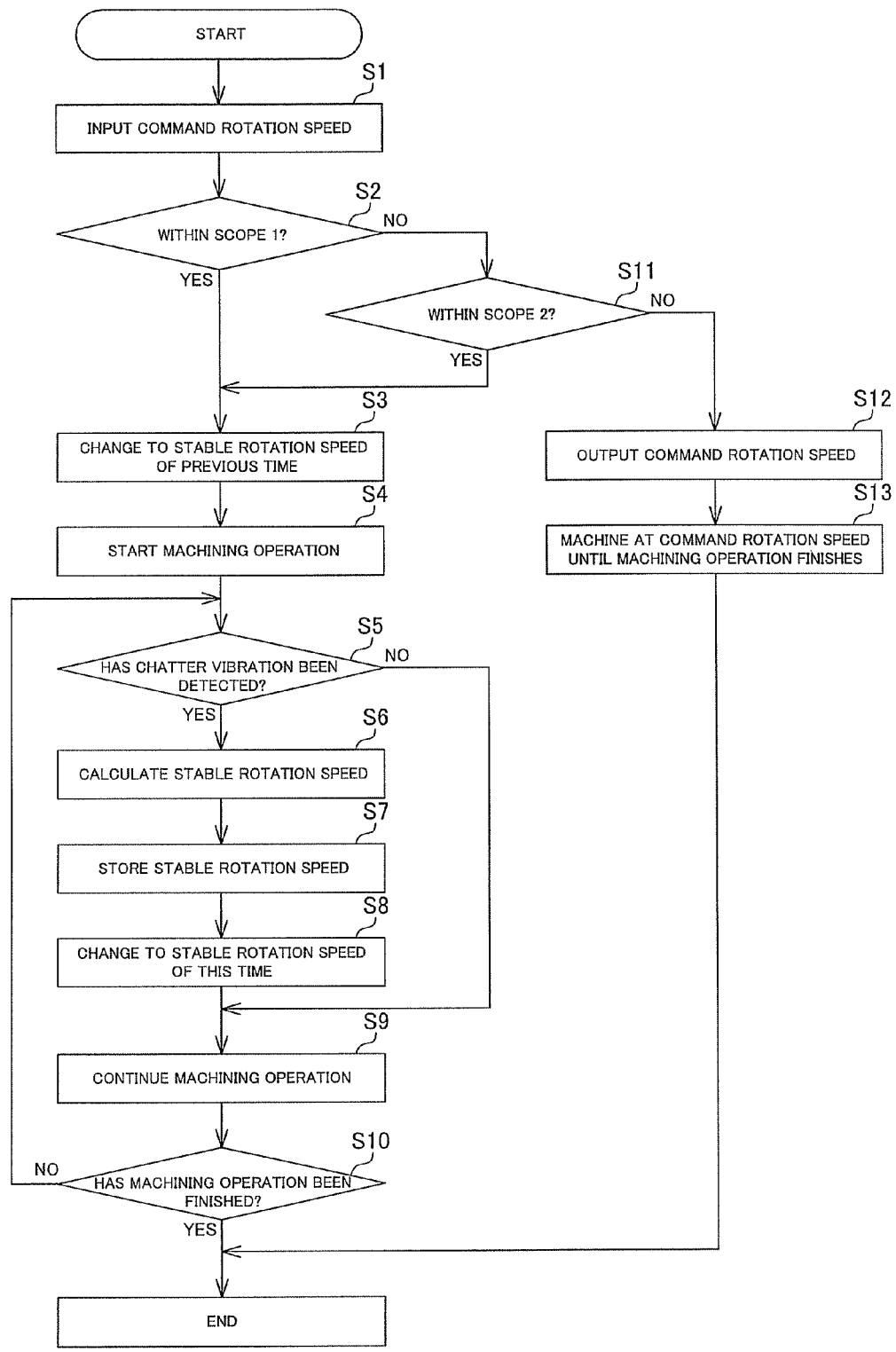
FIG. 4 is a flowchart showing vibration suppressing control of "chatter vibration" by the vibration suppressing device of the embodiment 1.

Here, vibration suppressing control of the "chatter vibration" by the vibration suppressing device 10 will be described according to a flowchart of FIG. 4, a table of FIG. 5, a graph of FIG. 6 and the like.

First, when the command rotation speed is inputted (S1), the arithmetical unit 12 determines whether the command rotation speed inputted is within a scope 1 or scope 2 stored in the memory unit 13 or not (S2 and S11). When the command rotation speed is within the scope 1 (determined to be YES in S2) or within the scope 2 (determined to be YES in S11), the process proceeds to S3. However, when the machining operation within the scope 1 or within the scope 2 is the first time, the stable rotation speed has not been stored in the memory unit 13. Therefore, the arithmetical unit 12 outputs the command rotation speed to the NC device 14 in S3 as it is, and the rotary shaft 3 is rotated at the command rotation speed in the rotary shaft housing 1 and the machining operation is started under control of the NC device 14 (S4). On the other hand, when the command rotation speed is neither within the scope 1 nor within the scope 2 (determined to be NO in both of S2 and S11), the arithmetical unit 12 outputs the command rotation speed to the NC device 14 as it is (S12), and the machining operation is performed at the command rotation speed until the machining operation finishes (S13). Further, the scope used for determination in S2 and S11 is a predetermined rotation speed range, the scope 1 is set beforehand as 6,000 min$^{-1}$-9,000 min$^{-1}$, and the scope 2 is set beforehand as 15,000 min$^{-1}$-21,000 min$^{-1}$. Furthermore, the scope 1 and scope 2 are the scopes including the command rotation speed most frequently commanded. Therefore, the S12 and S13 are rarely executed, and are executed only in such machining operation with a low rotation speed (4,000 min$^{-1}$ or below) for example at which the chatter vibration is not liable to be generated.

Figure 6:
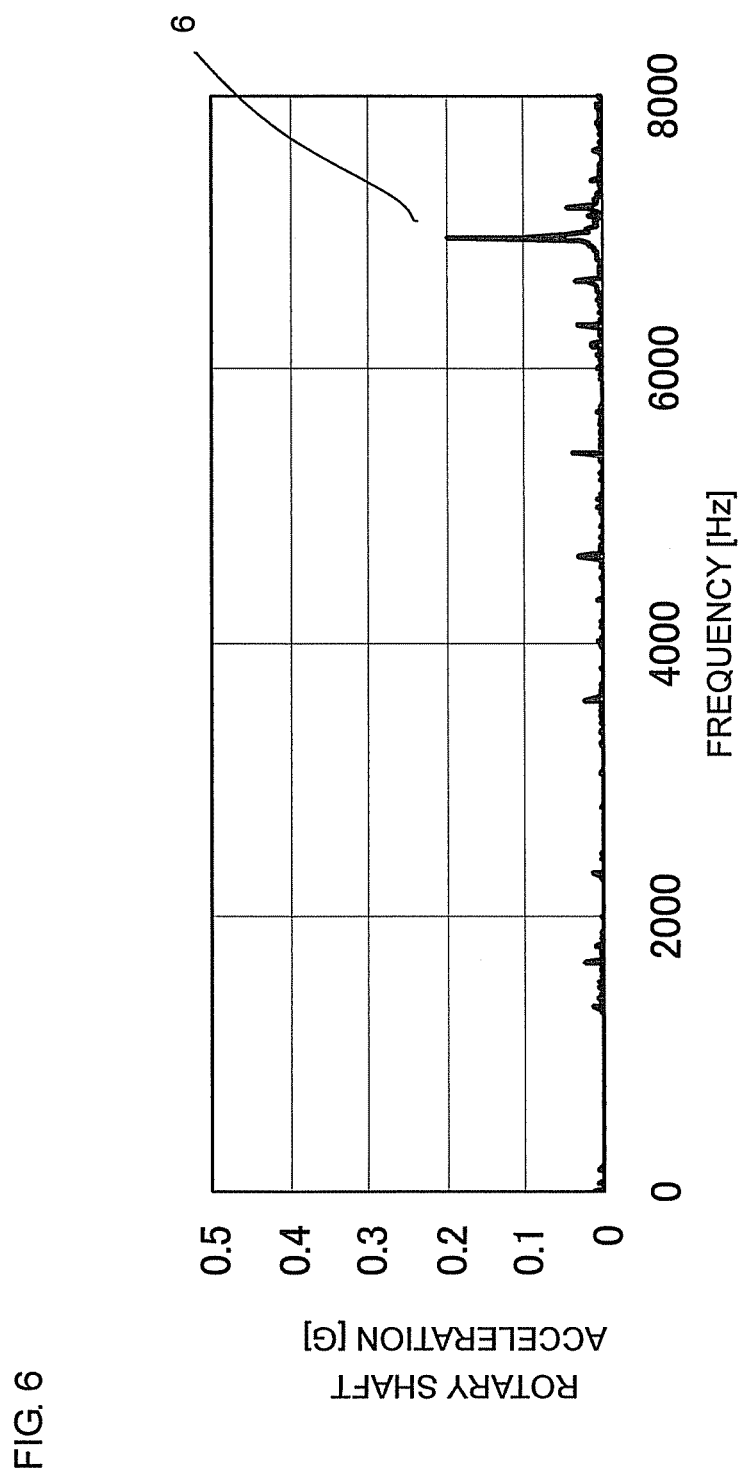
FIG. 6 is an explanatory drawing showing an example of a result of Fourier analysis of time-domain vibrational acceleration of the embodiment 1.

Further, when the machining operation has been started in S4, the vibration detecting unit 11 performs Fourier analysis of the time-domain vibrational acceleration in the vibration sensors 2a-2c detected always during the machining operation, analyzes the relation between the frequency of the rotary shaft 3 and the frequency-domain vibrational acceleration (vibrational acceleration on frequency axis) of the rotary shaft 3 in the frequency as shown in FIG. 6, monitors whether or not the maximum value of the frequency-domain vibrational acceleration (maximum acceleration) has exceeded the predetermined threshold value set beforehand, and detects generation of the "chatter vibration" (S5). Further, when the maximum value of the frequency-domain vibrational acceleration has exceeded the threshold value (determined to be YES in S5), the stable rotation speed is calculated by the calculation formula (1) below using the frequency of the rotary shaft 3 that becomes the maximum value (that is, the "chatter frequency" and vibration 6 in FIG. 6) (S6) with the understanding that the "chatter vibration" that has to be suppressed has been generated in the rotary shaft 3.

Stable rotation speed={60×chatter frequency/the number of tool flutes×(k number+1)}  (1)

Here, "the number of tool flutes" is the number of the flutes of the tool mounted on the rotary shaft 3, and is inputted in the arithmetical unit 12 for calculating the stable rotation speed beforehand. The k number is an integer value of 0 or above, and the stable rotation speed is calculated by consecutively substituting k=0, 1, 2, 3, 4 . . . .

Further, out of the stable rotation speeds calculated consecutively starting from k=0, a first stable rotation speed that is a value within the scope 1 when the present rotation speed is within the scope 1 and the stable rotation speeds before and after the first stable rotation speed (that is, the stable rotation speeds calculated using k=n−1 and k=n+1 when the k number in calculating the first stable rotation speed is k=n) are stored in the memory unit 13 in a form shown in FIG. 5 (S7). On the other hand, a second stable rotation speed that is a value within the scope 2 when the present rotation speed is within the scope 2 and the stable rotation speeds before and after the second stable rotation speed (that is, similar to the case of the first stable rotation speed, the stable rotation speeds calculated using k=m−1 and k=m+1 when the k number in calculating the second stable rotation speed is are stored in the memory unit 13 in the form shown in FIG. 5 (S7). The rotation speed of the rotary shaft 3 is changed to the first stable rotation speed calculated this time when the command rotation speed inputted in S1 is within the scope 1, or to the second stable rotation speed calculated this time when the command rotation speed inputted in S1 is within the scope 2 (S8). Further, in S7, maximum values of the frequency-domain vibrational acceleration that have exceeded the threshold value are also stored in the memory unit 13 as shown in FIG. 5.

Thereafter, the machining operation is continued at the stable rotation speed changed (S9), and detection of the "chatter vibration" and change of the rotation speed in the detection in S5 to S8 are repeated until the machining operation finishes (YES in S10). Therefore, every time the "chatter vibration" is detected, a new first stable rotation speed or a new second stable rotation speed is calculated by the calculation formula (1) using the chatter frequency of the "chatter vibration" and is stored in the memory unit 13, and the machining operation is continued changing the rotation speed to the newest first stable rotation speed (or second stable rotation speed). When the "chatter vibration" is not detected, the machining operation is continued without changing the rotation speed from the stable rotation speed. Then, the process comes to an end when the machining operation finishes. When the new first stable rotation speed and the new second stable rotation speed are stored in the memory unit 13, the previous first stable rotation speeds, second stable rotation speeds and the like are not erased and are stored adding the new first stable rotation speed and the like as shown in FIG. 5. Further, the history of the first stable rotation speed and the like can be displayed on a display unit (not shown) or can be outputted in a paper medium and the like.

Next when the machining operation within the scope 1 or within the scope 2 is the second time or later and if the command rotation speed is inputted (S1), similarly to the first time, the arithmetical unit 12 determines whether or not the command rotation speed inputted is within the scope 1 or scope 2 stored in the memory unit 13 (S2 and S11). When the command rotation speed is within the scope 1 (YES in S2), the newest first stable rotation speed out of the first stable rotation speeds stored in the memory unit 13 is outputted to the NC device 14 instead of the command rotation speed (S3), and the rotary shaft 3 is rotated at the first stable rotation speed to start the machining operation (S4). Further, when the command rotation speed is within the scope 2 (YES in S11), the newest second stable rotation speed out of the second stable rotation speeds stored in the memory unit 13 is outputted to the NC device 14 instead of the command rotation speed (S3), and the rotary shaft 3 is rotated at the second stable rotation speed to start the machining operation (S4).

After the machining operation is started, similarly to the machining operation of the first time, detection of the "chatter vibration" and change of the rotation speed in the detection in S5 to S8 are repeated until the machining operation finishes, and when the "chatter vibration" is detected while the rotary shaft 3 is rotated at the first stable rotation speed or the second stable rotation speed, a new first stable rotation speed or the second stable rotation speed is calculated by the calculation formula (1) using the chatter frequency of the "chatter vibration" and is stored in the memory unit 13, and the machining operation is continued changing the rotation speed to the new first stable rotation speed (or second stable rotation speed) calculated this time.

According to the vibration suppressing device 10 executing the vibration suppression control as described above, when the command rotation speed is inputted in starting the machining operation, if the command rotation speed is within the scope 1 or within the scope 2, the command rotation speed is changed to the first stable rotation speed or the second stable rotation speed calculated in the machining operation of the previous time, and the rotary shaft 3 is rotated at the first stable rotation speed or the second stable rotation speed to start the machining operation. Accordingly, the machining operation is started at a stable rotation speed with lower possibility of generating the "chatter vibration" than in the case of the command rotation speed. Therefore, the possibility of finishing the machining operation never generating the "chatter vibration" becomes high. Accordingly, it is possible to finish the machined surface highly accurately without any remaining chattering mark, and machining efficiency and machined surface accuracy can be improved.

Whether the "chatter vibration" has been generated or not is detected even during the machining operation performed at the first stable rotation speed or the second stable rotation speed. When generation of the "chatter vibration" has been detected, a new first stable rotation speed (or second stable rotation speed) is calculated, the machining operation is continued at the new first stable rotation speed (or second stable rotation speed). Further, the new first stable rotation speed (or second stable rotation speed) is stored in the memory unit 13, and, when the machining operation is started next time, the machining operation is started at the new first stable rotation speed (or second stable rotation speed). Therefore, the "chatter vibration" can be suppressed more effectively.

Further, in the memory unit 13, not only the newest first stable rotation speed but also the first stable rotation speeds therebefore and the like are stored, and the maximum value of the frequency-domain vibrational acceleration detected as the "chatter vibration" as well as the stable rotation speeds out of the scope 1 or out of the scope 2 (that is, the rotation speed calculated using the above k=n−1 and the like) are also stored. Therefore, by referring to those histories, the history of the change of the machining condition can be secured easily. Accordingly, the change of the condition can be managed, and estimation of the wear of the tool and prediction of the life of the tool are also possible.

The vibration suppressing device in relation with the present invention is not limited by any means to the embodiment described above, and the detecting unit, control device, and the constitution related to control and the like of vibration suppression in the control device can be changed appropriately according to the necessity within the scope not departing from the purposes of the present invention.

For example, although the above embodiment is constituted so as to output the command rotation speed within the scope 1 or within the scope 2 as it is in the machining operation of the first time, it is also possible to constitute so that, by obtaining dynamic characteristics of a mechanical system by impulse excitation and working out a stability limit diagram and the like, the first stable rotation speed and the second stable rotation speed are obtained beforehand and are stored in the memory unit 13. Thus, the command rotation speed is changed to the first stable rotation speed (or the second stable rotation speed) in S3 in the first time.

Further, although the above embodiment is constituted so as to detect the vibrational acceleration of the rotary shaft by the vibration sensors, it is also possible to constitute so as to detect the deflection of the rotary shaft and the sound pressure caused by vibration and to calculate an optimum rotation speed based on the deflection and the sound pressure.

Furthermore, in storing the first stable rotation speed and the second stable rotation speed, whether or not the maximum value of the frequency-domain vibrational acceleration and the stable rotation speed outside the scope are stored and the like can also be changed appropriately. In detecting the chatter vibration, it is also possible to use not only the waveform in which the frequency-domain vibrational acceleration shows the maximum value but also a plurality of (three, for example) waveforms in which the value of the frequency-domain vibrational acceleration is high, and to further improve thereby the suppressing effect of the "chatter vibration".

In addition, although the above embodiment is constituted so as to detect the vibration in the rotary shaft of the machine tool, it is also possible to constitute so as to detect the vibration of the side not rotated (fixed side) and to calculate the optimum rotation speed. Further, the embodiment can be applied not only to a machining center rotating the tool but also to such a machine tool as a lathe and the like rotating the workpiece. It will be needless to mention that the installation position, the number of installations and the like of the detecting unit may be changed appropriately according to the kind, size and the like of the machine tool.

Embodiment 2

Next, another embodiment of the present invention will be described based on the drawings.

Figure 7:
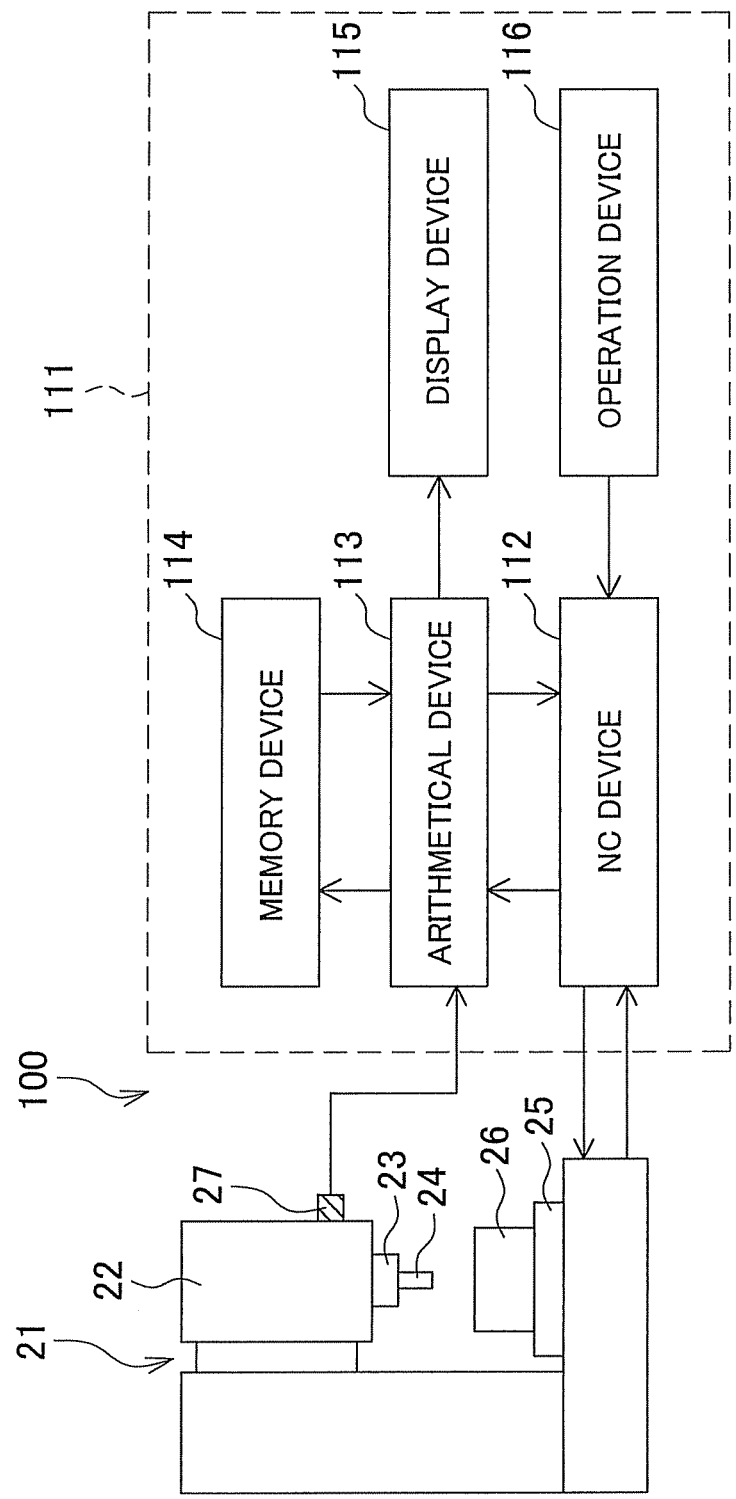
FIG. 7 is an explanatory drawing showing a block constitution of a vibration suppressing device of an embodiment 2.

FIG. 7 is a schematic configuration diagram showing a vertical machining center that is an example of a machine tool and a vibration suppressing device 100 arranged in the vertical machining center.

First, the vertical machining center 21 has a known constitution that a main spindle 23 as a rotary shaft rotatable around the C-axis is provided in a main spindle head 22 arranged in the upper part, and a workpiece 26 set on a working table 25 below is machined by a tool 24 attached to the main spindle 23. In the machining center 21, an NC device 112 controls rotation of the main spindle 23 according to an NC program, and the tool 24 is automatically changeable by an automatic tool changing device (not shown).

The vibration suppressing device 100 is for controlling the "chatter vibration" generated in the main spindle 23. The vibration suppressing device 100 includes vibration sensors 27 for detecting the time-domain vibrational acceleration generated in the main spindle 23 under rotation, and a control device 111 controlling the rotation speed of the main spindle 23 based on detected values detected by the vibration sensors 27. Arrangement of the vibration sensors 27 is the same as that of the embodiment 1.

The control device 111 includes the NC device 112 as a rotation speed changing unit and a rotation speed substituting unit for controlling the mechanical motion, an arithmetical device 113 as a detecting unit performing Fourier analysis based on the time-domain vibrational acceleration detected by the vibration sensors 27 and a history control unit, a memory device 114 storing the calculated values calculated by the arithmetical device 113, the suppression history of the chatter vibration and the like, a display device 115 displaying a result calculated by the arithmetical device 113 or a calculation result based on the result, and an operation device 116 allowing the operator to perform inputting operation to the NC device 112.

Figure 8:
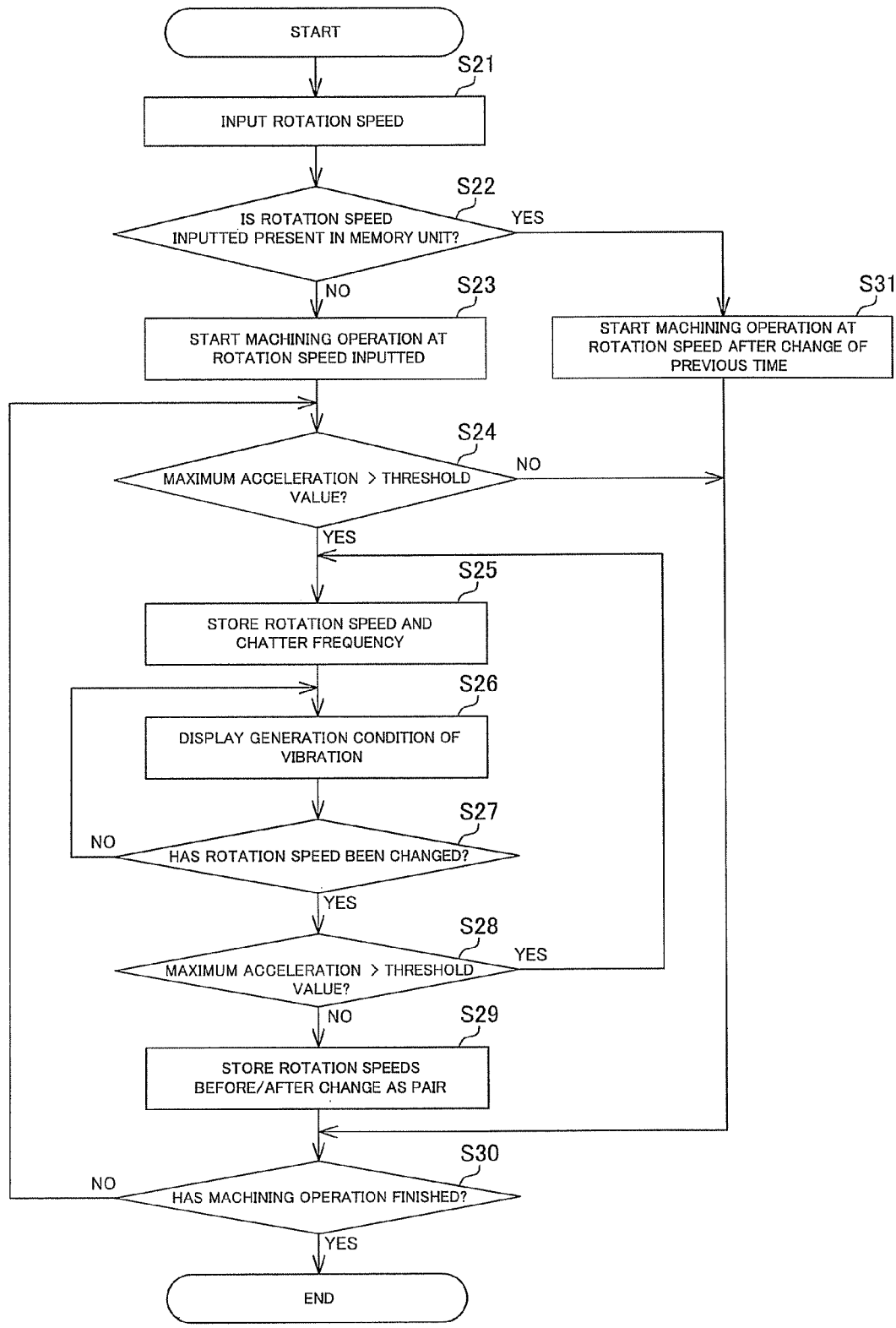
FIG. 8 is a flowchart of vibration suppressing control of the embodiment 2.

Suppression control of the "chatter vibration" in the vibration suppressing device 100 constituted as described above will be described based on the flowchart in FIG. 8.

First, when an optional rotation speed is inputted by the operation device 116 and start of the machining operation is commanded in S21, whether the rotation speed inputted is present in the memory unit 114 or not, that is, whether or not the rotation speed inputted is the rotation speed before the change out of a pair of rotation speeds stored, is determined in S22. When the machining operation is the first time, the memory is not present, therefore the main spindle 23 is rotated at the rotation speed inputted and the machining operation is started in S23.

During the machining operation, the vibration obtained by the vibration sensors 27 is monitored, the vibration is converted to the frequency-domain vibrational acceleration by the arithmetical device 113, and the value of the maximum acceleration obtained is compared in S24 with a threshold value set beforehand. When the maximum acceleration exceeds the threshold value in the determination, the chatter vibration is determined to have been generated, the rotation speed and the chatter frequency then are stored in the memory device 114 in S25. Then, the result associating the rotation speed and the vibration condition is calculated and the calculation result is displayed on the display device 115 in S26.

Figure 9:
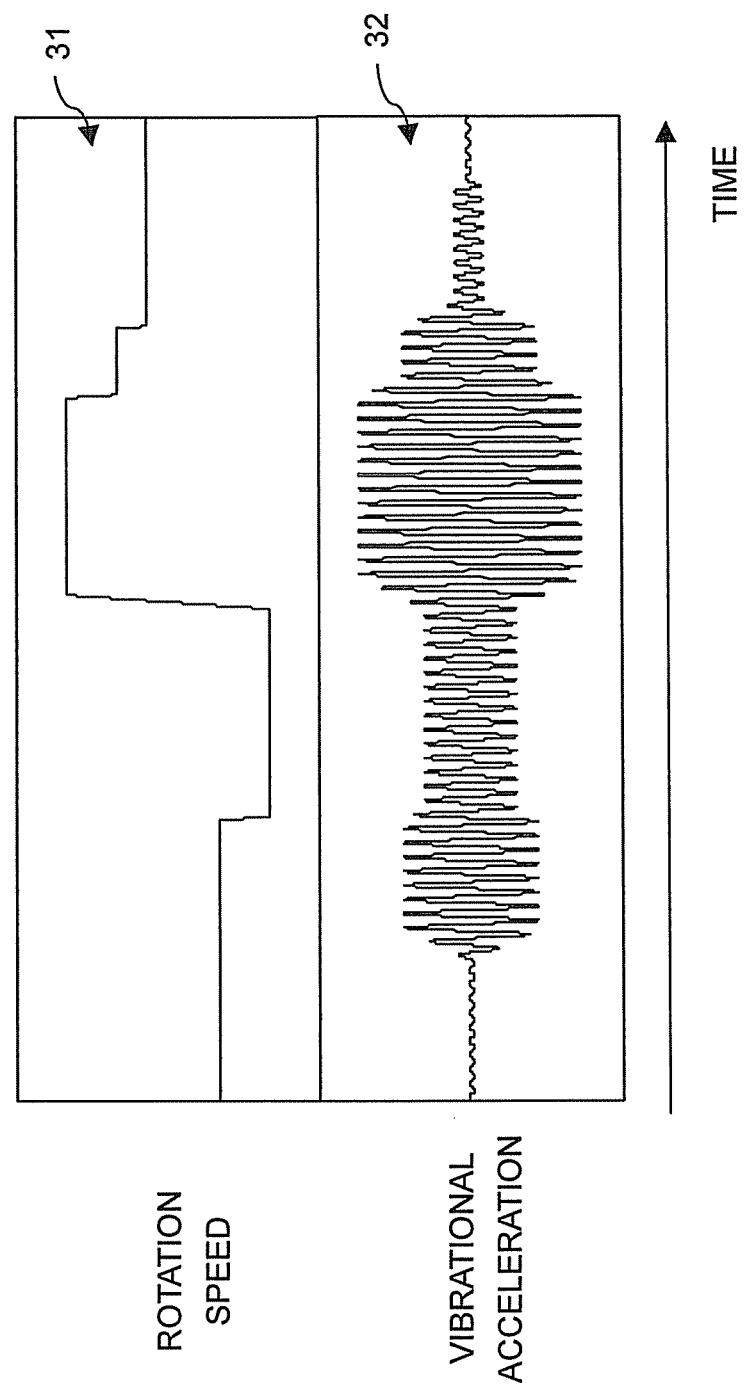
FIG. 9 is an explanatory drawing showing a relation between the rotation speed and vibrational acceleration, and time of the embodiment 2.

The display shows in real time the temporal waveform of the vibrational acceleration or the waveform showing the vibrational acceleration that is frequency-analyzed from time to time in order to know an increase/decrease of the vibrational acceleration accompanying variation of the rotation speed. As shown in FIG. 9 for example, it displays a time axis waveform 31 of the rotation speed and a time axis waveform 32 of the vibrational acceleration arranging vertically with one being placed above the other and matching the measuring time to each other. According to the display, the magnitude of the vibrational acceleration in each rotation speed is known easily.

Figure 10:
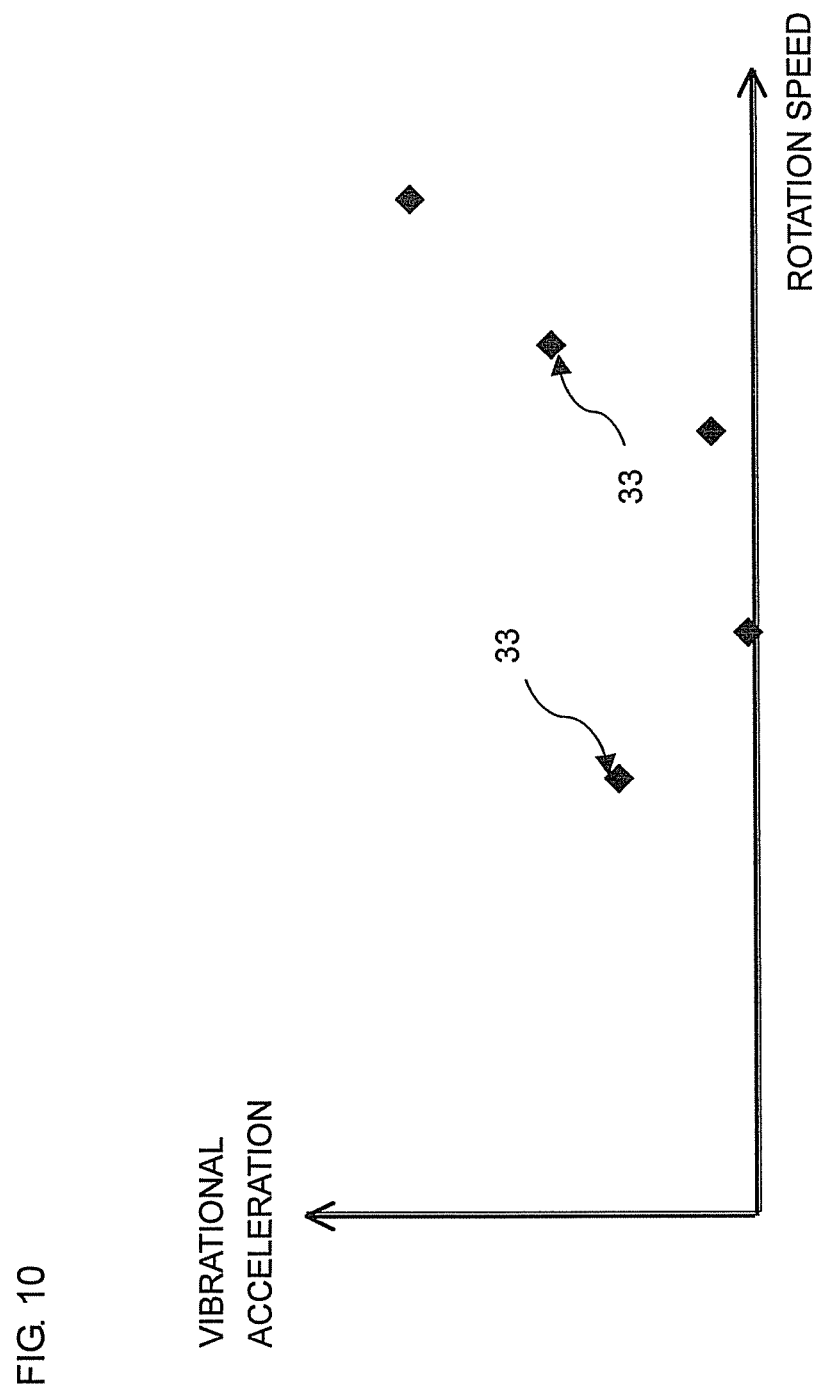
FIG. 10 is an explanatory drawing showing a relation between the vibrational acceleration and rotation speed of the embodiment 2.

As an alternative, the vibrational acceleration in each rotation speed can be displayed also as a marker 33 associating the rotation speed on an abscissa with the vibrational acceleration on an ordinate as shown in FIG. 10. Then, the vibrational acceleration shown in the ordinate is a peak value of the temporal waveform or the peak value of the waveform of the vibrational acceleration performed with the frequency analysis.

Figure 11:
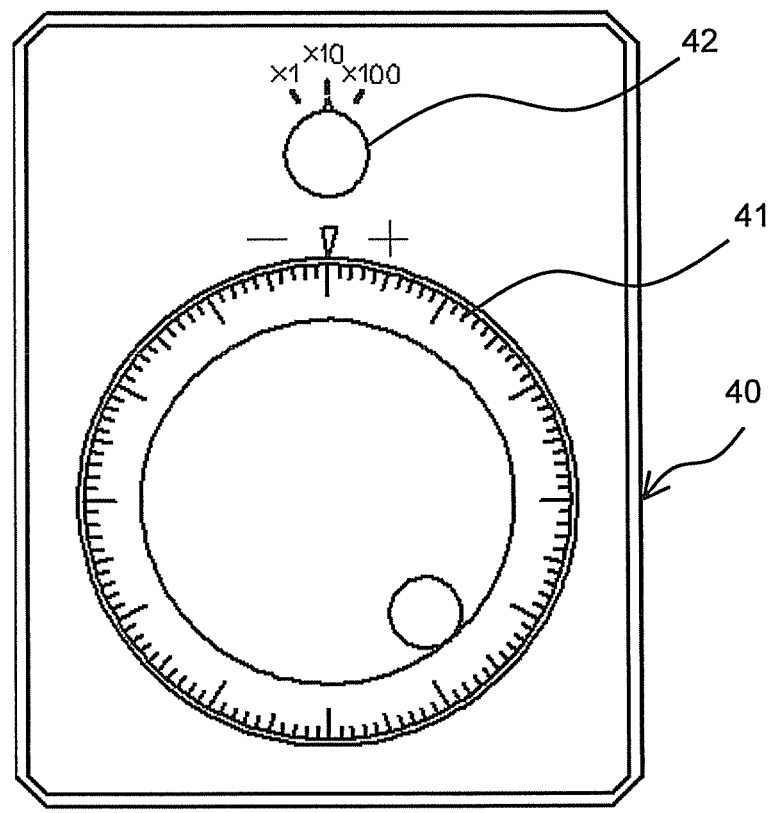
FIG. 11 is an explanatory drawing of a pulse signal generator of the embodiment 2.

Therefore, in S27, the operator commands the NC device 112 to change the rotation speed referring to the displayed result on the display device 115. As the operation device 116 performing the command, a pulse signal generator 40 can be considered as shown in FIG. 11 for example. The pulse signal generator 40 includes a pulse type handle 41 capable of continuously changing the rotation speed by 1 $min^{-1}$ at the minimum by rotating operation, and a magnification adjust switch 42 capable of changing the change amount when the pulse type handle 41 is rotated by one graduation in three stages of 1 time, 10 times and 100 times. That is, the present rotation speed can be changed by a value obtained by multiplying the change amount of the pulse type handle 41 by the magnification of the magnification adjust switch 42.

Figure 12:
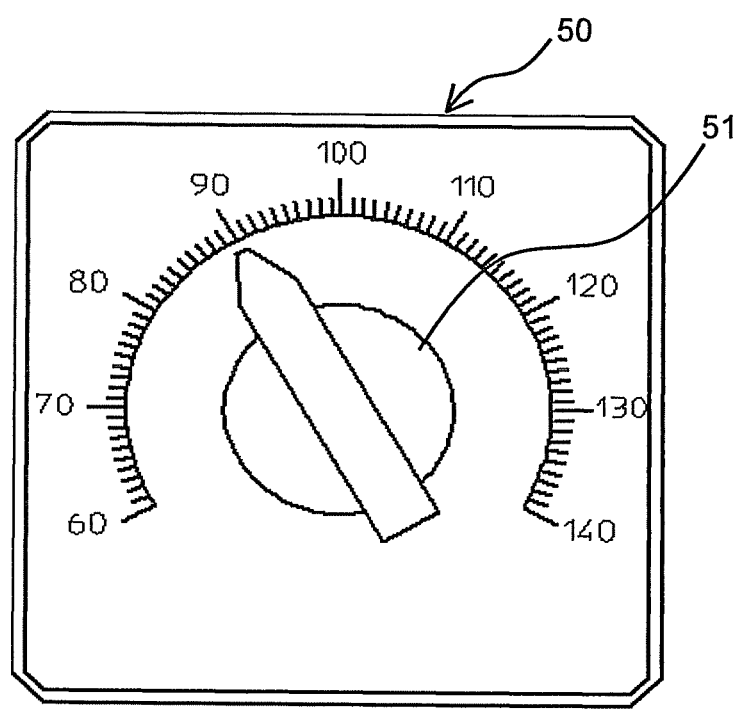
FIG. 12 is an explanatory drawing of an angular position detector of the embodiment 2.

As an alternative, by using an angular position detector 50 as shown in FIG. 12, the present rotation speed can be changed by multiplying the ratio assigned to the angle of an override adjust knob 51 (changing by 1% with one graduation, increasing by rotating clockwise, decreasing by rotating counter-clockwise) by the present rotation speed.

Figure 13:
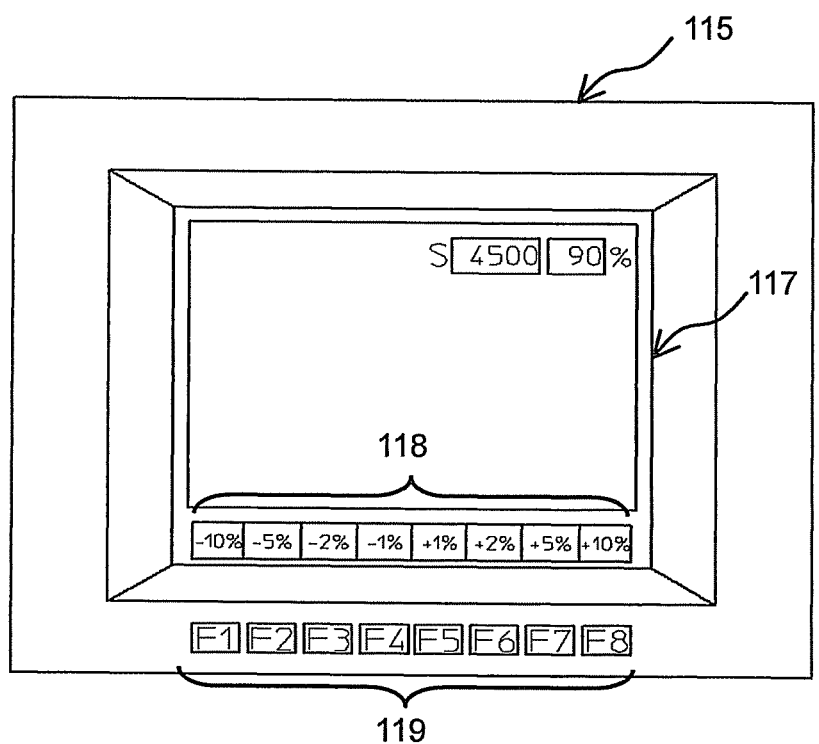
FIG. 13 is an explanatory drawing of a display device and an operation device of the embodiment 2.

Further, as shown in FIG. 13, by using operation buttons 118 displaying the change amount of ±1% to ±10% attached to the display device 115 provided with a monitor 117 or operation keys 119 arranged corresponding to the operation buttons 118, the present rotation speed can be changed matching a value obtained by multiplying the ratio assigned to each operation button 118 or each operation key 119 by the present rotation speed. Then, because the change amount accumulates according to the number of times of pressing, the present rotation speed and the change ratio are displayed on the monitor 117.

However, when the rotation speed is changed by the pulse signal generator 40, the angular position detector 50, the operation buttons 118 and the like, it is preferable to be changed with the change ratio of the rotation speed by 10% or below in terms of the main spindle override. With the ±10% or below main spindle override, minute adjustment of the rotation speed can be performed easily.

Figure 14:
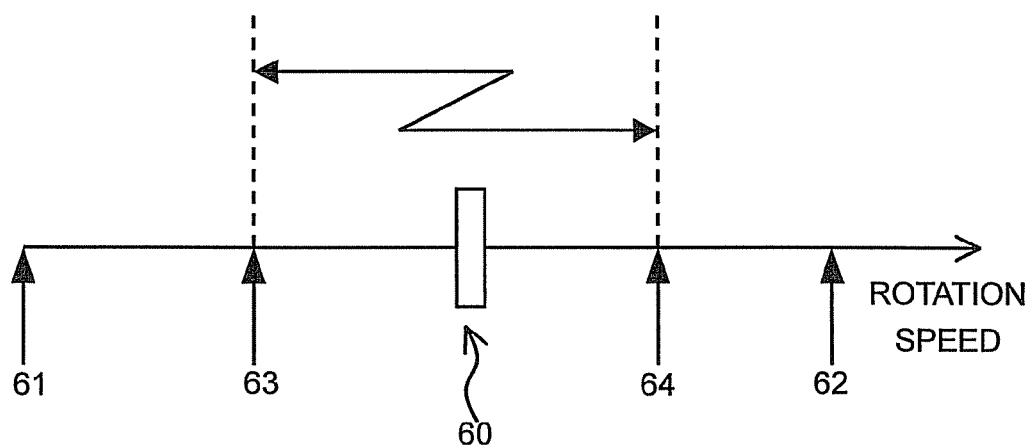
FIG. 14 is an explanatory drawing showing a variable scope of the rotation speed of the embodiment 2.

Further, when the rotation speed is changed, in order to perform the work safely, it is preferable that, as shown in FIG. 14, a rotary shaft rotation speed lower limit 61 and a rotary shaft rotation speed upper limit 62 as well as a set rotation speed lower limit 63 and a set rotation speed upper limit 64 set by the operator are held, and the rotation speed can be changed only when the present rotation speed 60 is within a range whose lower limit is the higher one out of the rotary shaft rotation speed lower limit 61 and the set rotation speed lower limit 63 and whose upper limit is the lower one out of the rotary shaft rotation speed upper limit 62 and the set rotation speed upper limit 64.

After the rotation speed is changed thus in S27, the arithmetical device 113 compares the value of the maximum acceleration obtained again during machining with the threshold value set beforehand in S28. When the result is YES, that is, the value of the maximum acceleration exceeds the threshold value, it is understood that the chatter vibration is still generated. Thus, the process returns to S25, and the processes of storing the rotation speed and the chatter frequency as well as displaying the generation condition on the display device 115 are continued.

On the other hand, when the chatter vibration is determined not to have been generated in the determination of S28, the arithmetical device 113 stores the rotation speeds of before and after the change as a pair in the memory device 114 in S29. When the machining operation has not been finished in the determination of S30, the processes starting from S24 are continued.

When new machining operation is performed after the pair of the rotation speeds before and after the change are stored and the machining operation is finished, and if the rotation speed is inputted in S21, the NC device 112 determines whether the rotation speed inputted is present in the memory device 114 or not, that is, whether the rotation speed inputted is the rotation speed before the change or not out of the pair of the rotation speeds stored in S22. When the rotation speed inputted is the rotation speed before the change of the previous time, the main spindle 23 is rotated in S31 at the rotation speed after the change that forms the pair therewith. Accordingly, when machining operation is newly started, the machining operation can be performed at an optimum rotation speed with which the chatter vibration is not generated from the beginning.

Thus, according to the vibration suppressing device 100 of the embodiment 2, the device 100 includes the vibration detecting unit (the vibration sensors 27 and the arithmetical device 113) detecting generation of the chatter vibration, the rotation speed changing unit (the pulse signal generator 40 and the like and the NC device 112) changing the rotation speed of the main spindle 23, the history control unit (the arithmetical device 113) storing the rotation speeds before and after the change as a pair in the memory device 114 when the arithmetical device 113 does not detect generation of the chatter vibration at the rotation speed after changing by the NC device 112, and the rotation speed substituting unit (the NC device 112) rotating, when the rotation speed commanded in the machining operation of the next time is the same as the rotation speed of before the change stored in the memory device 114 by the arithmetical device 113, the main spindle 23 at the rotation speed after the change that forms the pair with the rotation speed before the change substituting for the rotation speed commanded. As a result, the machining operation can be performed substituting the rotation speed for the optimum rotation speed at which stable machining operation can be performed even when the chatter vibration is generated if the commanded value is maintained, and therefore stable machining operation in which the chattering mark is not generated from the beginning can be achieved.

Here, in particular, the rotation speed changing unit such as the pulse signal generator 40 and the like changes the rotation speed of the main spindle 23 with 10% or below override, and therefore minute adjusting of the rotation speed can be effected easily.

The embodiment 2 is configured so that the generation condition of the chatter vibration is displayed on the display device as it is. It is also possible to make the arithmetical device calculate the rotation speed at which the chatter vibration can be suppressed (optimum rotation speed) based on the chatter frequency at which the frequency-domain vibrational acceleration becomes maximum when the chatter vibration is generated and the number of flutes of the tool, and to display the optimum rotation speed on the display device. Thus, the operator can change the rotation speed for suppressing the chatter vibration more securely and quickly. Instead of changing the rotation speed by the operator, the rotation speed can be automatically changed to the optimum rotation speed calculated by the arithmetical device when the chatter vibration is generated. In any case, by keeping the suppressing history of the chatter vibration, the rotation speed after the change can be substituted in the machining operation of the next time.

On the other hand, for detection of the vibration from the machine tool, a microphone, a position and rotation detector, electric current of the motors for the main spindle and the feed shaft can be used in addition to the vibration sensors. Further, the generation condition of the vibration may be displayed using not only the relation of the rotation speed and the vibrational acceleration but also the vibration frequency, cutting speed, feed rate, rotary shaft torque, and the like.

In addition, the present invention can be applied not only to the machine tool of the vertical machining center but also to other machine tools such as an NC lathe performing machining operation by rotating a workpiece mounted on a rotary shaft, and the like.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A vibration suppressing device for suppressing chatter vibration generated in a rotary shaft in a machine tool having the rotary shaft for rotating a tool or a workpiece, the vibration suppressing device comprising:
    a detecting unit configured to detect generation of the chatter vibration;
    an arithmetical unit configured to calculate a stable rotation speed capable of suppressing the chatter vibration based on a value detected by the detecting unit;
    a rotation speed control unit configured to control a rotation speed of the rotary shaft; and
    a memory unit configured to store the stable rotation speed calculated by the arithmetical unit in association with a rotation speed range in which the stable rotation speed is included;
    wherein, when a command rotation speed that is rotation speed of the rotary shaft is inputted at time of starting machining operation by rotation of the rotary shaft and, the arithmetical unit determines whether or not the command rotation speed is included in the rotation speed range, reads out the stable rotation speed when the command rotation speed is included in the rotation speed range, outputs the stable rotation speed to the rotation speed control unit instead of the command rotation speed, and starts machining operation at the stable rotation speed.

2. The vibration suppressing device according to claim 1, wherein, when generation of chatter vibration is detected by the detecting unit during machining operation at the read out stable rotation speed, the arithmetical unit calculates a new stable rotation speed based on a detected value related with the chatter vibration detected this time, commands the rotation speed control unit to change the rotation speed of the rotary shaft to the new stable rotation speed, stores the new stable rotation speed in the memory unit in association with the rotation speed range, and, when a command rotation speed included in the rotation speed range is inputted next time, outputs the new stable rotation speed to the rotation speed control unit.

3. The vibration suppressing device according to claim 2, wherein the detecting unit detects time-domain vibration accompanying rotation of the rotary shaft, obtains frequency of the rotary shaft and frequency-domain vibrational acceleration in the frequency based on time-domain vibration, compares frequency-domain vibrational acceleration and a predetermined threshold value, and, when the frequency-domain vibrational acceleration exceeds the predetermined threshold value, determines that chatter vibration has been generated, and the arithmetical unit stores, in the memory unit, the frequency-domain vibrational acceleration of the time when the chatter vibration is determined to have been generated.

4. The vibration suppressing device according to claim 1, wherein the detecting unit detects time-domain vibration accompanying rotation of the rotary shaft, obtains frequency of the rotary shaft and frequency-domain vibrational acceleration in the frequency based on time-domain vibration, compares frequency-domain vibrational acceleration and a predetermined threshold value, and, when the frequency-domain vibrational acceleration exceeds the predetermined threshold value, determines that chatter vibration has been generated, and the arithmetical unit stores, in the memory unit, the frequency-domain vibrational acceleration of the time when the chatter vibration is determined to have been generated.

5. The vibration suppressing device according to claim 4, wherein the arithmetical unit calculates a plurality of stable rotation speeds capable of suppressing the chatter vibration based on a detected value by the detecting unit, and stores a stable rotation speed not included in the rotation speed range also in the memory unit along with a stable rotation speed included in the rotation speed range out of the plurality of the stable rotation speeds.

6. A vibration suppressing device for suppressing chatter vibration generated in a rotary shaft in a machine tool having the rotary shaft for rotating a tool or a workpiece, the vibration suppressing device comprising:

a detecting unit configured to detect generation of the chatter vibration;

a rotation speed changing unit configured to change a rotation speed of the rotary shaft;

a history control unit configured to store, when the detecting unit for vibration does not detect generation of the chatter vibration at the rotation speed after changing by the rotation speed changing unit, the rotation speeds of before and after change in a memory device as a pair; and a rotation speed substituting unit configured, when the rotary shaft is rotated and machining operation is started and if the rotation speed commanded is equal to the rotation speed before changing stored in the memory device by the history control unit, to rotate the rotary shaft at the rotation speed after the change that forms a pair with the rotation speed before the change instead of the rotation speed commanded.

7. The vibration suppressing device according to claim 6, wherein the rotation speed changing unit is configured to change the rotation speed of the rotary shaft at 10% or below override.

* * * * *